United States Patent
Schilling et al.

(10) Patent No.: US 9,770,934 B2
(45) Date of Patent: Sep. 26, 2017

(54) MULTI-LAYER BODY

(75) Inventors: Andreas Schilling, Hagendorn (CH); Wayne Robert Tompkin, Baden (CH); Achim Hansen, Zug (CH)

(73) Assignee: OVD Kinegram AG, Zug (CH)

( * ) Notice: Subject to any disclaimer, the term of this patent is extended or adjusted under 35 U.S.C. 154(b) by 1415 days.

(21) Appl. No.: 13/382,453

(22) PCT Filed: Jul. 5, 2010

(86) PCT No.: PCT/EP2010/004057
§ 371 (c)(1),
(2), (4) Date: Mar. 2, 2012

(87) PCT Pub. No.: WO2011/003558
PCT Pub. Date: Jan. 13, 2011

(65) Prior Publication Data
US 2012/0146323 A1    Jun. 14, 2012

(30) Foreign Application Priority Data

Jul. 9, 2009  (DE) .................. 10 2009 032 697

(51) Int. Cl.
*B42D 25/00*     (2014.01)
*B42D 25/328*    (2014.01)
(Continued)

(52) U.S. Cl.
CPC .......... *B42D 25/328* (2014.10); *B42D 25/00* (2014.10); *B42D 25/21* (2014.10); *B42D 25/29* (2014.10);
(Continued)

(58) Field of Classification Search
None
See application file for complete search history.

(56) References Cited

U.S. PATENT DOCUMENTS

| 5,876,068 A | 3/1999 | Schneider et al. |
| 7,194,105 B2 * | 3/2007 | Hersch ................. B42D 25/342 382/100 |

(Continued)

FOREIGN PATENT DOCUMENTS

| CN | 101120139 | 2/2008 |
| CN | 101379423 | 3/2009 |

(Continued)

*Primary Examiner* — Kyle Grabowski
(74) *Attorney, Agent, or Firm* — Hoffmann & Baron, LLP

(57) ABSTRACT

The invention relates to a multi-layer body (1) comprising a first layer (13) having a multiplicity of first zones (21), which are respectively separated from one another by one or a plurality of transparent second zones (22). The multi-layer body has a second layer (14) composed of a transparent material, said second layer being arranged below the first layer (13), and a reflection layer (15) arranged below the second layer (14). The second layer (14) has a multiplicity of third zones (23), in each of which a microstructure (17) is impressed into the interface—facing away from the first layer—between the second layer (14) and the reflection layer, which is covered with the reflection layer (15). Each of the microstructures (17) is configured such that it reflects back and/or diffracts back light incident perpendicularly with respect to the plane spanned by the first layer from the direction of the first layer in the region of the respective third zone (23) onto a region of the first layer whose area is smaller than the area of the respective third zone (23) by at least a factor of 10. The microstructures (17) are arranged in accordance with a microstructure grid having a distance between adjacent microstructures in a second spatial direction of less than 300 μm.

42 Claims, 8 Drawing Sheets

(51) Int. Cl.
  *B42D 25/21*   (2014.01)
  *G02B 3/00*   (2006.01)
  *G02B 5/18*   (2006.01)
  *B42D 25/29*   (2014.01)

(52) U.S. Cl.
  CPC ......... *G02B 3/0056* (2013.01); *G02B 5/1861* (2013.01); *B42D 2035/20* (2013.01); *B42D 2035/44* (2013.01)

(56) References Cited

U.S. PATENT DOCUMENTS

| | | | |
|---|---|---|---|
| 7,808,710 B2 | 10/2010 | Hansen et al. | |
| 2006/0018021 A1* | 1/2006 | Tomkins | B42D 25/328 359/558 |
| 2007/0058260 A1 | 3/2007 | Steenblik et al. | |
| 2007/0291362 A1* | 12/2007 | Hill | B42D 25/29 359/567 |
| 2008/0160226 A1* | 7/2008 | Kaule | B42D 15/00 428/141 |
| 2009/0008923 A1 | 1/2009 | Kaule et al. | |
| 2009/0122412 A1 | 5/2009 | Steenblik et al. | |
| 2009/0290221 A1 | 11/2009 | Hansen et al. | |
| 2009/0297805 A1 | 12/2009 | Dichtl | |
| 2010/0045024 A1 | 2/2010 | Attner et al. | |
| 2010/0084851 A1 | 4/2010 | Schilling | |
| 2011/0045248 A1 | 2/2011 | Hoffmuller et al. | |
| 2011/0079997 A1 | 4/2011 | Heim | |
| 2012/0146323 A1 | 6/2012 | Schilling et al. | |
| 2014/0175785 A1 | 6/2014 | Kaule et al. | |

FOREIGN PATENT DOCUMENTS

| | | |
|---|---|---|
| DE | 102006029536 A1 | 12/2007 |
| DE | 102007039996 A1 | 2/2009 |
| DE | 102007057658 A1 | 6/2009 |
| DE | 102007061827 A1 | 6/2009 |
| DE | 102007062089 | 7/2009 |
| EP | 0064067 | 5/1982 |
| EP | 0330733 A1 | 4/1988 |
| EP | 2451650 | 8/2014 |
| JP | 2001/324949 | 11/2001 |
| JP | 2002/120500 | 4/2002 |
| JP | 2008-529851 | 8/2008 |
| JP | 2008-545550 | 12/2008 |
| JP | 2009-541803 | 11/2009 |
| JP | 2009-541873 | 11/2009 |
| WO | WO2006/087138 | 8/2006 |
| WO | WO2006/125224 | 11/2006 |
| WO | WO2007/076952 | 7/2007 |
| WO | WO2008/000350 | 1/2008 |
| WO | WO2008/000402 | 1/2008 |
| WO | WO2008008635 | 1/2008 |
| WO | WO2009/000528 | 12/2008 |
| WO | WO2011/003558 | 1/2011 |

* cited by examiner

MULTI-LAYER BODY

This application claims priority based on an International Application filed under the Patent Cooperation Treaty, PCT/EP2010/004057, filed on Jul. 5, 2010, and German Application No. DE 102009032697.9-45, filed on Jul. 9, 2009.

BACKGROUND OF THE INVENTION

The invention relates to a multi-layer body, in particular a multi-layered security element for protecting security documents, in particular banknotes or ID documents or packagings or goods.

Security documents, for safeguarding purposes, are often provided with security elements which make it possible to check the authenticity of the security document and afford protection against counterfeiting of the security document. In this case, it is known to use, as security elements, multi-layered film elements which are applied to the carrier substrate of the security document and exhibit optically variable effects. Thus, by way of example, EP 0 330 733 A1 or EP 0 064 067 A1 discloses such film elements having diffraction-optical structures that are responsible for generating the optically variable effect. What is disadvantageous here, however, is that security elements based on such structures are in circulation in large numbers and, consequently, the optically variable effects that can be obtained by such structures are used in many cases.

SUMMARY OF THE INVENTION

The invention is based on the stated object, then, of providing an improved multi-layer body which exhibits novel optically variable effects.

This object is achieved by a multi-layer body comprising a first layer having a multiplicity of opaque and/or reflective first zones, which are respectively separated from one another by one or a plurality of transparent second zones, wherein the first zones are shaped as microimages having a smallest dimension of less than 100 μm and are arranged in accordance with a microimage grid having a distance between adjacent microimages in a first spatial direction of less than 300 μm, wherein the microimage grid spans a first coordinate system having a coordinate axis x1 and a coordinate axis y1 at right angles thereto, comprising a second layer composed of a transparent material, said second layer being arranged below the first layer, and comprising a reflection layer arranged below the second layer, wherein the second layer has a multiplicity of third zones, in each of which a microstructure is impressed into the interface—facing away from the first layer—between the second layer and the reflection layer, which is covered with the reflection layer, wherein each of the microstructures is configured such that it reflects back and/or diffracts back light incident perpendicularly with respect to the plane spanned by the first layer from the direction of the first layer in the region of the respective third zone onto a region of the first layer whose area is smaller than the area of the respective third zone by at least a factor of 10, wherein the microstructures are arranged in accordance with a microstructure grid having a distance between adjacent microstructures in a second spatial direction of less than 300 μm, which microstructure grid spans a second coordinate system having a coordinate axis x2 and a coordinate axis y2 at right angles thereto, and wherein, in a first region of the multi-layer body, the microimages of the microimage grid and the microstructures of the microstructure grid are arranged in overlapping fashion in a fixed position with respect to one another and the microstructure distance determined by the distance between the area centroids of adjacent third zones and the microimage distance determined by the distance between the area centroids of adjacent first zones differ from one another in at least one third spatial direction in the first region by not more than 10%. This object is furthermore achieved by a multi-layer body comprising a first layer having one or a plurality of transparent first zones, which are respectively separated from one another by one or a plurality of transparent second zones, wherein the first layer is configured such that the first and the second zones have a different transmission behavior for the incident light, in particular are colored differently, have different transmittivity and/or deflect the incident light differently, comprising a second layer composed of a transparent material, said second layer being arranged below the first layer, and comprising a reflection layer arranged below the second layer, wherein the second layer has a multiplicity of third zones, in each of which a microstructure is impressed into the interface—facing away from the first layer—between the second layer and the reflection layer, which is covered with the reflection layer, wherein each of the microstructures is configured such that it reflects back and/or diffracts back light incident perpendicularly with respect to the area spanned by the first layer from the direction of the first layer in the region of the respective third zones onto a region of the first layer whose area is smaller than the area of the respective third zone by at least a factor of 10, wherein the microstructures are arranged in accordance with a microstructure grid having a distance between adjacent microstructures of less than 300 μm, which microstructure grid spans a second coordinate system having a coordinate axis x2 and a coordinate axis y2 at right angles thereto.

The invention provides a multi-layer body having a novel optically variable effect. The multi-layer body according to the invention is distinguished by the fact that it has very high protection against imitation and counterfeiting. Thus, the security element cannot be copied either by holographic copying techniques or by mechanical impression of surface structures present at the surface of the multi-layer body.

It has surprisingly been found that through the choice of the dimensions specified above and the use of the specific microstructures specified above, depending on the viewing angle, different partial regions of the respective microimages become visible and, on account of the above-described configuration of the microstructure grid and the relative arrangement of the microstructure grid and of the microimage grid, the optically variable impression generated in adjacent zones for the human observer merges together and, consequently, a two-dimensional or three-dimensional optically variable image impression or an optically variable image impression having a depth effect with high brilliance can become visible. Furthermore, it has surprisingly been found that such optically variable image impressions can also be obtained by means of the above-described specific configuration of transparent first and second zones.

With regard to the configuration and orientation of the microstructures and microimages, in particular the following has proved to be advantageous:

When viewing the security element with substantially horizontally oriented or horizontally extending or oriented microstructures and/or microimages, no depth effect occurs since both eyes perceive substantially the same images; with substantially vertically oriented or vertically extending or oriented microstructures and microimages, a depth effect occurs since both eyes respectively perceive slightly different image impressions, which the human brain then combines into an image having a depth effect. In the case of diagonal orientations or courses of the microstructures and microimages, i.e. in the case of intermediate stages between horizontal and vertical, a partial depth effect occurs.

Further advantageous configurations of the invention are designated in the dependent claims.

In accordance with one preferred exemplary embodiment of the invention, in the first region, the area proportion constituted by the first zones in the total area of the first and second zones is between 40% and 2%, in particular between 20% and 5%. This affords the advantage that the optically variable effect of the multi-layer body is manifested in a particularly pronounced manner and with high luminous intensity because the area filling factor of the total area of the first and second zones is comparatively low and, as a result, the layer with the microimages has the highest possible transmission.

Furthermore, it is advantageous that in the first region, the area occupied by the first zones is smaller than the area occupied by the third zones at least by a factor of 4, in particular by a factor of 10 to 20. Furthermore, it is advantageous if in the area occupied by the third zones is smaller than the area occupied by the third zones by not more than a factor of 50. Furthermore, it is advantageous if, in the first region, the area occupied by each of the first zones is smaller than the area occupied by the respectively assigned third zone in each case by the abovementioned factors. These measures likewise have the consequence that the optically variable effect generated by the multi-layer body is manifested with particularly high luminous intensity, with high contrast and in a particularly pronounced manner.

Preferably, the layer thickness of the second layer is between 5 µm and 150 µm and/or the reflection layer is at a distance from the first layer of between 5 µm and 150 µm in the first region. In this case, in the first region, the average distance between the first layer and the reflection layer is preferably between 15 µm and 75 µm. Investigations have shown that, in the case of such a distance between the layers generating the optically variable effect, a particularly pronounced viewing angle dependence of the optically variable effect is achieved.

In accordance with one preferred exemplary embodiment of the invention, the microstructures are in each case embodied and/or the layer thickness of the second layer is chosen such that the microstructures reflects back and/or diffracts back light incident perpendicularly with respect to the plane spanned by the first layer from the direction of the first layer in the region of the respective third zone onto a region of the first layer whose area is smaller than the area of the respective third zone by a factor in the range of 10 to 10 000. If the width or length of the region onto which the light is reflected back and/or diffracted back substantially corresponds to the width or length of the respective third zone, then the abovementioned factor is preferably chosen from the range of 10 to 200, with further preference from the range of 15 to 30. If the region onto which the light is reflected back and/or diffracted back is reduced in its dimensions in two different directions, in particular in two mutually perpendicular directions, relative to the dimensions in the corresponding directions of the respective third zones, then the abovementioned factor is preferably chosen from the range of 50 to 10 000, with further preference from the range of 150 to 2500. Preferably, said factor is furthermore chosen such that the area onto which the incident light is reflected back and/or diffracted back is smaller than the area of the respectively assigned first zone by the factor of 50. By virtue of such a design of the microstructures, in particular with regard to the layer thickness of the second layer, an optically variable effect having particularly sharp contours and high luminous intensity is generated by the multi-layer body.

Preferably, the third zones are shaped in the form of a polygon, in particular in the form of a rectangle. However, it is also possible for the third zones to have a round or elliptical outer contour. A triangular, quadrangular or octagonal shaping of the third zones is particularly advantageous, since a seamless transition between adjacent third zones and hence an embodiment of the optically variable effect with particularly high luminous intensity can be obtained as a result.

In accordance with one preferred exemplary embodiment of the invention, the microstructures are embodied as diffractive structures, in particular embodied as diffractive structures having a spatial frequency of more than 300 lines/mm, with further preference of more than 1000 lines/mm.

The microstructures can be embodied as diffractive or refractive microstructures. In particular, linear or cross gratings in the line number range of 100 lines/mm to 4000 lines/mm can be involved in this case. Furthermore, isotropic or anisotropic matt structures, kinoform structures, blazed gratings or a combination of the aforementioned structures can be involved. Furthermore, diffractive or refractive freeform elements can be involved, which, in particular, are embodied like concave mirrors and produce an optical magnification, reduction or distortion effect. The profile form can be semicylindrical, hemispherical, trapezoidal or triangular.

In this case, the relief form and spatial frequency of the microstructure are chosen differently within the region of the respective third zone, such that the light incident on the third zone is diffracted back differently in different regions of the third zone and hence—as already described above—the light diffracted back by the microstructure on the first layer takes up an area which is smaller than the area of the respective third zone at least by the factor of 10.

Preferably, the region onto which the light is diffracted back by the microstructure has the shaping of the respective third zone and the area centroid of said region is congruent with the area centroid of the respective third zone. However, it is also possible for the shaping of said region to differ from the shaping of the respective third zone and also for the area centroids of the region and of the respective third zone not to be congruent.

The microstructures can be embodied as a kinoform, for example, which has the diffraction characteristic described above. In accordance with a further preferred exemplary embodiment of the invention, the spatial frequency of the microstructure and/or the flank inclination of a flank of the microstructure are/is varied in the region of the third zone in order thus to obtain the above-described effect as a result of the diffraction of the incident light, said diffraction being different depending on location. Thus, by way of example, the spatial frequency of the microstructure is chosen such that it has a frequency of 0 lines/mm to 10 lines/mm in the region of the area centroid of the respective third zone and the spatial frequency of the microstructure increases in at least one spatial direction proceeding from the area centroid, for example increases linearly or quadratically. Furthermore, it is also possible for the microstructure in the region of the area centroid in one direction to be unmodulated, i.e. to have no spatial frequency, or to be modulated and have a spatial frequency of between 0.05 line/mm to 10 lines/mm.

Furthermore, by way of example, the flank inclination of that flank of the structure elements of the microstructure which is oriented in relation to the area centroid of the respective third zone can be increased in at least one spatial direction proceeding from the area centroid, that is to say that said flank is particularly steep in the edge regions of the third zone and particularly flat in the central region of the third zone. These measures can also be combined with one another and it is also possible for the minimum of the flank inclination/spatial frequency not to lie in the region of the area centroid, but also to lie in an edge region of the third zone.

By way of example, the microstructure used can be a microstructure defined by the following 1D phase function:

$$Ph(x)=-2*\pi/wl*(fl^2-\sqrt{fl^2-x^2})$$

Ph: phase function
wl: design wavelength
fl: focal length
x: spatial coordinate

The line number distribution results from the phase function by diffraction with respect to the spatial coordinate.

Furthermore, it is also possible for the microstructures to be a blazed grating having substantially triangular structure elements. In this case, it is advantageously provided that, in a first region of the third zone and in a second region of the third zone, the structure elements of the blazed grating are arranged in a manner rotated by 180° with respect to one another, that is to say that the inclined areas of the structure elements face one another. Preferably, the first zone is in this case divided into two partial regions of approximately the same size by a separating line running through the area centroid of the respective third zones, wherein, in one partial region and in the other partial region, the structure elements are arranged in a manner rotated by 180° relative to one another. Furthermore, it is also possible for the azimuth angle of the blazed grating to vary continuously. Thus, it is possible, for example, for a blazed grating to be used which, proceeding from the area centroid of the respective third zone, has a constant spatial frequency in all spatial directions, such that the structure elements in each case have an annular form in the areas spanned by the multi-layer body.

Furthermore, it is also possible for the microstructure to be a structure that substantially acts by reflection. In order to obtain the desired reflection properties of the microstructure which are different in a manner dependent on location in the respective third region, the microstructure is in this case preferably shaped such that the local structure depth of the microstructure, that is to say the local layer thickness of the replication lacquer layer, after the impression of the microstructure, preferably decreases in at least one spatial direction proceeding from the area centroid of the respective third zone. By way of example, the structure depth of the microstructure is in this case chosen as follows:

$$H(x)=R-\sqrt{R^2-x^2}$$

H: structure depth
R: radius of curvature
X: spatial coordinate

In this case, the function H(x) describes the structure depth in a respective one of the third zones, i.e. a period of the microstructure impressed in the second layer.

In accordance with a further preferred embodiment of the invention, the microstructure can consist of the superimposition of a coarse structure and a fine structure. The coarse structure is preferably chosen from the above-described structures having a substantially refractive action and can therefore be shaped for example in the form of a concave mirror, semicylindrically, trapezoidally or triangularly. The fine structure is preferably formed by a diffractive structure, preferably having a spatial frequency of between 1000 lines/mm and 3600 lines/mm. Preferably, the microstructure in this case has two or more partial regions in which the coarse structure is superimposed by different fine structures. Thus, by way of example, the adjacent flanks of the coarse structure described above are covered with different diffractive structures which generate different optically variable information, for example represent diffractive structures for generating different holograms.

In accordance with one preferred exemplary embodiment of the invention, each of the third zones in the first region is surrounded by one or a plurality of fourth zones in which the reflection layer is not provided. This makes it possible to provide the multi-layer body with an additional security feature that acts in transmission. Preferably, for this purpose, the multi-layer body is embodied in transparent fashion in the region of the fourth zone. Given a corresponding choice of the fourth zones, it is furthermore also possible for the optically variable effect of the multi-layer body to become visible not only when viewed in reflected light but also when viewed in transmitted light. In this case, it is furthermore advantageous to provide further microstructures in the region of the fourth zone, which scatter the light incident in the region of the fourth zone from the underside of the multilayer body and/or deflect it in the direction of the third zone.

Furthermore, it is also possible for the reflection layer to be embodied as a transparent reflection layer in the third zones and/or in the fourth zones. For this purpose, the reflection layer can consist, for example, of a transparent metallic layer or microstructured metallic layer or else of a dielectric layer having a height refractive index, for example can be configured as an HRI layer (HRI=high refraction index). Given a suitable choice of parameters of this transparent or translucent reflection layer, substantially the same optical feature can be viewed both in transmission and in reflection.

In accordance with one preferred exemplary embodiment of the invention, the first layer—as already described above—has one or a plurality of transparent first zones, which are respectively separated from one another by one or a plurality of transparent second zones. The first and second zones are accordingly embodied in transparent fashion. Transparent in this context means that the first layer has a transmissivity of 50% or more in the range of light perceptible to the human eye, preferably has a transparency of more than 80% in this wavelength range. Opaque is understood to mean a transmissivity of less than 50%, preferably of less than 90%, relative to the wavelength range specified above. As already explained above, in this exemplary embodiment of the invention, the transparent first and second zones have a different transmission behavior for the incident light. In this case, it is particularly advantageous if the first zones and the second zones are colored differently, the first zone is colored in a primary color, for example, and thus shows the color of said primary color when viewed in transmitted light, and the second zones are pellucidly transparent or colored with a different, preferably contrasting color and thus show a corresponding contrasting color or no color in transmitted light, i.e. change or do not change the wavelength spectrum of the incident light by means of the filter effect of the color.

Furthermore, it is also possible for the first and second zones to have a different transmissivity in the wavelength range of visible light. Preferably, the difference in transmittivity is in this case at least 5%, with further preference at least 10%.

Furthermore, it is preferred if the first zones and the second zones deflect the incident light differently, for example the incident light is deflected in the first zones and is not deflected in the second zones.

In accordance with one preferred exemplary embodiment of the invention, for this purpose, in the first layer, a respective first diffractive or refractive structure for deflecting the incident light is provided in the one or the plurality of first zones and no such structure is provided or a second diffractive or refractive structure for deflecting the incident light, which differs from the first structure, is provided in the one or the plurality of second zones. These structures are preferably structures which are impressed into the surface of the first layer or a partial layer of the first layer, preferably impressed into the interfaces between the first layer and the top side of the multi-layer body, i.e. between the first layer and air. Furthermore, it is also possible, however, for these structures to be impressed into the underside of the first layer or a partial layer of the first layer or to be impressed between two transparent layers of the first layer which have a difference in refractive index of more than 0.2. Furthermore, it is also possible for these structures to be formed by volume holograms which are written in a volume hologram layer.

The one or the plurality of first zones is or are preferably shaped in each case in the form of an image, in particular a pictorial representation, in the form of numbers and/or letters or a motif. Furthermore, it is also possible for the one or the plurality of first zones to form in each case partial images of an overall image composed of the first zones.

Preferably, in the configuration of the structures as diffractive structures, the spatial frequency of the structures in the first zones is chosen such that the spatial frequency of the structure has a minimum in the region of the area centroid of the respective first zones and the spatial frequency of the microstructure increases in at least one spatial direction proceeding from the area centroid. Preferably, the spatial frequency increases in all spatial directions proceeding from the area centroid in a manner dependent on the distance R from the area centroid. Preferably, the spatial frequency in this case represents a function f(R), that is to say that the spatial frequency of the structure is determined by the distance from the area centroid. The spatial frequency is in this case preferably chosen to be between 100 lines/mm and 3600 lines/mm.

Furthermore, it has proved to be worthwhile for the flank inclination of that flank of the structure elements of the structure which is oriented in relation to the area centroid of the respective first zone to increase in at least one spatial direction proceeding from the area centroid.

If the first structure is designed as a structure having substantially diffractive action, then the structure is preferably embodied in such a way that the structure depth of the structure has its minimum or maximum in the region of the area centroid of the respective first zone and increases or decreases in at least one spatial direction proceeding from the area centroid of the respective first zones. In this case, the structure can be shaped in such a way that the function describing its structure depth is continuous and differentiable. However, it is also possible for said structure to be embodied in triangular or trapezoidal fashion, for example.

Further advantages can be obtained by virtue of the structure depth increasing or decreasing in all spatial directions proceeding from the area centroid in a manner dependent on the distance from the area centroid. Preferably, the structure depth T is thus determined by a function f(R), where R is the distance from the area centroid of the respective first zone.

In the above-described embodiment of the one or of the plurality of first zones as transparent zones having a different transmission behavior, one exemplary embodiment of the invention provides for the one or the plurality of first zones to have a smallest dimension of more than 300 µm, in particular to have a width and/or height of more than 3 mm. Therefore, the one or the plurality of first zones has or have a dimension which can be resolved by the human observer. The generation of a pictorial, optically variable representation is effected here by the different transmission of the incident light by the first and second zones, by the above-described deflection in the third zones and by the corresponding influencing of the light reflected back during passage through the first and second zones of the first layer.

Furthermore, in accordance with one preferred exemplary embodiment of the invention, it is also possible that the first zones are shaped as microimages having a smallest dimension of less than 100 µm and are arranged in accordance with a microimage grid having a distance between adjacent images of less than 300 µm, wherein, as a result, the microimage grid is spanned a first coordinate system having a coordinate axis x1 and a coordinate axis y1 at right angles thereto, and wherein in a first region of the multi-layer body, the microimages of the microimage grid and the microstructures of the microstructure grid are arranged in overlapping fashion in a fixed position with respect to one another and the microstructure distance determined by the distance between the area centroids of adjacent third zones and the microimage distance determined by the distance between the area centroids of adjacent first zones differ from one another in at least one spatial direction in the first region by not more than 10%.

In accordance with a further preferred exemplary embodiment of the invention, the first layer is embodied such that it has a multiplicity of opaque and/or reflective first zones, which are respectively separated from one another by one or a plurality of transparent second zones.

In this case, it has proved to be expedient if the first layer is formed by a metal layer, wherein the metal of the metal layer is provided in the first zones and is not provided in the second zones.

In accordance with one preferred exemplary embodiment of the invention, a first diffractive surface structure is impressed in the lower interface—oriented toward the second layer—of the first layer in the first zones. The first diffractive surface structure is, for example, a hologram or Kinegram®, which exhibits, for example, in a manner dependent on viewing angle, different motifs or movement effects. Furthermore, it is also possible for the diffractive surface structure to be a zeroth-order diffraction structure, a simple diffraction grating or a matt structure. Such a configuration makes it possible to generate interesting optically variable effects which are obtained from the superimposition of the optically variable effect brought about by the configuration of the multi-layer body according to the invention with the optically variable effect brought about by the first diffractive surface structure. Additional protection with respect to copying and imitation is obtained in this case by virtue of the fact that the first diffractive surface structure faces the second layer and, consequently, the optical effect thereof is imparted for view only indirectly via the microstructures, which makes it very difficult to reproduce the first diffractive surface structure.

It is furthermore advantageous in this case if the regions of the first zones in which the first diffractive surface structure is impressed are provided with a covering layer on their side facing away from the second layer, said covering layer preventing the optically variable effect of the first diffractive surface structure from being directly visible from the top side of the multi-layer body.

In accordance with a further preferred exemplary embodiment of the invention, a second diffractive surface structure, which differs from the first diffractive surface structure, is impressed in the second zones. This surface structures acting in transmission is preferably a surface structures which deflects the incident light in a specific angular position onto the third zones or which generates an optically variable effect that acts as a background for the optically variable effect generated by the multi-layer body according to the invention.

The first layer can consist, for example, of a metal layer, of layers of different metals, of a layer consisting of a printing ink, of a colored photoresist layer (negative/positive photoresist), of a thin-film system or a combination of such layers. In this case, a metallic layer preferably consists of aluminum, silver, copper, gold, chromium or an alloy comprising such metals.

In accordance with one preferred exemplary embodiment of the invention, the first layer consists of two or more partial layers arranged one above another. Said partial layers are, in particular, layers selected from the group: metal layer, HRI layer (HRI=high refractive index), replication lacquer layer and color layer. Thus, it is possible, for example, for the first layer to consist of the sequence of a color lacquer layer, a replication lacquer layer having an impressed first diffractive surface structure and a metal layer, which is provided in the first zones and is not provided in the second zones.

Preferably, a third diffractive surface structure is impressed into the surface—facing away from the second layer—of the first layer or a partial layer of the first layer in the first zones. The second layer is configured with further preference such that the optical effect of the third diffractive surface structure acts only on the light incident on the top side of the first layer, but does not act on the light incident on the underside of the first layer. This can be achieved, for example, by a covering layer, in particular a metallic layer, being provided below the diffractive surface structure, or different surface structures being impressed into the upper and lower interfaces of the first layer, for example by the third surface structure being impressed into the upper interface and the first surface structure being impressed into the lower interface between the first layer and the adjacent layers.

Such a configuration of the multi-layer body makes it possible to achieve further interesting optically variable effects, wherein, by way of example, the optically variable effect generated by the third diffractive surface structure acts as a background for the novel optically variable effect generated by the multi-layer body according to the invention.

Moreover, investigations have surprisingly shown that the contrast intensity of the novel optically variable effect can be further improved by means of a specific configuration of the third surface structure. If the third surface structure chosen is a surface structure having a depth-to-width ratio of the structure elements of more than 0.5 and a spatial frequency of more than 2000 lines/mm, e.g. a cross grating structure, then an improvement in contrast can be obtained.

Furthermore, it has also proved to be expedient for a fourth layer to be provided between the first and second layers, which is translucent or colored. In this case, the translucency or coloration can also be provided only partially, i.e. only in a partial area region of the layer.

The reflection layer with which the microstructures are covered preferably consists of an opaque reflection layer, for example a metal layer. However, it is also possible for the reflection layer to be formed by a transparent reflection layer, for example by a dielectric layer, for example an HRI layer (HRI=high refraction index), a very thin and thus transparent metal layer or a microstructured metal layer.

Furthermore, it is also possible for the reflection layer not to be provided in the fourth zones, or for the second layer to have regions in which the reflection layer has different reflection or transmission properties. Thus, it is possible, for example, for the second layer to be covered regionally with a transparent reflection layer and partly with an opaque reflection layer. In this case, the area coverage with the transparent reflection layer should be chosen such that at least 20% of the area is covered with an opaque reflection layer.

However, it is also possible for the entire second layer to be covered with a transparent reflection layer, in order thus, for example, below the optically variable effect generated, also to make visible optically variable effects of layers arranged below the reflection layer, for example of an imprint applied on the target substrate.

A layer is considered to be opaque here when it has a transmissivity of less than 1%. A layer is considered to be transparent when it has a transmissivity of at least 50%. In this case, the transmissivity indications preferably relate to the wavelength range that is visible to a human observer.

In accordance with one preferred exemplary embodiment of the invention, the coordinate axes y1 and the coordinate axis y2 and also the coordinate axis x1 and the coordinate axis x2 are respectively oriented parallel to one another in the first region. In this case, oriented parallel to one another means that the first and second layers, within the scope of manufacturing tolerance, are oriented with respect to one another such that the coordinate axes y1 and y2, and respectively x1 and x2, run parallel to one another within the scope of manufacturing tolerances. Furthermore, in the first region, the microstructure distance and the microimage distance between adjacent microstructures and microimages in the direction of at least one coordinate axis is chosen such that the microstructure distance and the microimage distance differ from one another by between 0.5 and 10%.

Furthermore, it is also possible for the coordinate axis y1 and the coordinate axis y2 and also the coordinate axis x1 and the coordinate axis x2 respectively to form an angle of between 0.01° and 5° in the first region. In this case, the microstructure distance and the microimage distance between adjacent microstructures and microimages are preferably chosen to be identical. Furthermore, it is also possible for the microstructure distance and microimage distance to be chosen to be different, in particular to be chosen in the abovementioned range.

In such a configuration of the multi-layer body, interesting movement effects can be obtained when the multi-layer body is tilted.

The first and second spatial directions preferably correspond to the direction of the coordinate axis x1 or y1 and x2 or y2.

The microimage grid and/or the microstructure grid can be embodied as a one-dimensional grid in the first region, that is to say that microimages and/or microstructures follow one another only in one spatial direction, in the first or second spatial direction. However, it is also possible for the microimage grid and/or the microstructure grid to form a two-dimensional grid in the first region, that is to say that microimages and/or microstructures succeed one another in two spatial directions and microimages and/or microstructures thus succeed one another for example in the direction of the coordinate axis y1 or y2 and in the direction of the coordinate axis x1 or x2.

In accordance with one embodiment of the invention, the grid pitch of the microimage grid and/or of the microstructure grid is chosen to be constant in the first region, that is to say that the microimage distance has a first constant value r1 in the direction of the coordinate axis x1, the microimage distance has a constant value r2 (which, however, can be different from the value r1) in the direction of the coordinate axis y1 (in the case of the two-dimensional grid) and/or that the microstructure distance has a value r3 in the direction of the x2 axis and the microstructure distance has a constant value r4 (which can be different from the value r3) in the direction of the y2-axis.

Complex movement effects can be obtained by virtue of the fact that the grid pitch of the microimage grid and/or of the microstructure grid changes, for example changes continuously, in at least one spatial direction in the first region. Thus, by way of example, particularly interesting movement effects were observed in a configuration of the multi-layer body in which the grid pitches of the microimages and/or microstructures are constant in the direction of the coordinate axis x1 and/or x2 in the first region and the grid pitches of the microimages and/or microstructures vary in the direction of the coordinate axis x1 and/or x2 in a manner dependent on the coordinate y determined by the coordinate axis y1 and/or y2 and/or the coordinate x determined by the coordinate axis x1 and/or x2 in accordance with a function $F(x,y)$.

In accordance with a further preferred embodiment of the invention, the longitudinal axis of the microimages is extended, preferably extended by more than 10-fold, relative to the transverse axis of the microimages by a transformation function. Preferably, such distorted microimages are used in combination with third zones which have a width of less than 300 µm and a length of more than 300 µm, in particular a length of between 2 mm and 100 mm.

Such multi-layer bodies are distinguished by the fact that the optically variable information exhibited during viewing differs significantly from the design of the first zones and the imitation of the optically variable effect generated by the multi-layer body is thus made more difficult.

The microimages of the microimage grid can be formed by identical microimages in the first region. Complex movement, magnification and reduction effects upon the tilting of the multi-layer body can be generated by virtue of the fact that the microimages of the microimage grid, in the first region, are formed by microimages formed by a geometric transformation of a basic image comprising rotation and/or magnification or reduction of the basic image and optional subsequent distortion in accordance with a transformation function. Furthermore, it is also possible for a first basic image to undergo transition to a second basic image via a predetermined movement path by means of a geometric transformation, and for the respectively adjacent microimages thus to differ slightly, for example, in accordance with the geometric transformation chosen.

The microstructures of the microstructure grid in the first region are preferably formed by identical microstructures. In order to obtain complex movement, magnification and reduction effects upon the tilting of the multi-layer body, however, it is also possible for at least two microstructures of the microstructure grid to differ from one another in the first region. In this case, it is particularly advantageous if the regions of the first layer onto which the light incident from the direction of the first layer in the region of the respective third zone is reflected back and/or diffracted back change in terms of their area, width and/or length in accordance with a transformation function in a manner dependent on the coordinate on the x2 and/or y2 coordinate axis.

In this case, a sectionally continuous and differentiable function with a distance between the maxima of more than 300 µm is preferably chosen as transformation functions.

In accordance with one preferred exemplary embodiment of the invention, the first and/or second coordinate system are/is formed by a coordinate system having circular or wavy line-shaped coordinate axes. As a result, counterfeiting or imitation of the optically variable effects generated by the multi-layer body is made more difficult.

It has proved to be expedient for the first region to have a smallest area dimension of more than 300 µm, in particular to have a smallest area dimension of more than 3 mm.

In accordance with a further preferred exemplary embodiment of the invention, the multi-layer body has a second region arranged alongside the first region, said second region being embodied as follows. In the second region, the microimages of the microimage grid and the microstructures of the microstructure grid are likewise arranged in a fixed position with respect to one another and the microstructure distance determined by the distance between the area centroids of adjacent third zones and the microimage distance determined by the distance between the area centroids of adjacent first zones differ from one another in at least one third spatial direction in the second region by not more than 10%. Furthermore, in the second region, the microimage grid and/or the microstructure grid differ(s) relative to the microimage grid and/or the microstructure grid in the first region in terms of one or more of the parameters selected from the group microimage distance, microstructure distance, orientation of the x1-, x2-, y1-, y2-coordinate axis and distortion of the microimages. What is achieved as a result is that differently optically variable effects are generated in the first and second regions, as a result of which a particularly distinctive and easily remembered security feature is provided by the multi-layer body. Alongside the second region, the multi-layer body can also have even further regions which are embodied like the first and second regions, but differ in one of the abovementioned parameters of the microimage grid and/or the microstructure grid from the microimage grid and/or the microstructure grid of the first and second regions.

In this case, the first, second and further regions can also each have a specific shaping that imparts specific further information to the observer, for example a shaping in the form of a symbol or a numerical sequence. With regard to the configuration of the second region and the further regions, reference is made to the above explanation regarding the configuration of the first region.

Particularly interesting, contrary movement effects can be obtained by virtue of the fact that the difference between the microimage distance and the microstructure distance is positive in the first region and negative in the second region. It is advantageous for such movement effects if static reference elements are present adjacent to the area region with the movement effect. These static elements can serve as relative optical reference points or fixed points for the eye, in order that the movement effect can be perceived well. Such static elements can be adjoining edges, static prints or else optically variable elements which do not generate a movement effect, but rather e.g. a color change effect.

Further interesting optical effects can be obtained by virtue of the fact that the microimages of the microimage grid differ from one another in the first region and in the second region, or, the microimage grid and/or the microstructure grid have/has a phase offset with respect to one another in relation to one of the coordinate axes, in particular in partial area regions. Further interesting optical effects can be obtained by virtue of the fact that the microstructures of the microstructure grid in the first region differ from the microstructures of the microstructure grid in the second region, in particular the regions of the first layer onto which the light incident from the direction of the first layer in the region of the respective third zone is reflected back and/or diffracted back differ in terms of their area, width and/or length.

Further interesting optical effects can be obtained by virtue of the fact that different partial image information items in the microimages of the microimage grid are interlaced in one another, i.e. interleaved in one another or arranged such that the respective partial image information items within the microimage grid are repeated regularly, in particular, wherein the grid orientation and the grid width relative to the grid orientation and the grid width of the microstructure grid determines the type of resulting visual effect. By varying these parameters (number of different partial image information items, image content of the different partial image information items, relative orientation of the partial image information items with respect to the microstructure grid, grid width of the partial image information items relative to the grid width of the microstructure grid), it is thus possible to generate different visual effects such as, for example, overlapping, in particular contrary, movement effects, image flips (transformation effect from one image to another image), image morphings (transformation effect from one image into another image by means of intermediate images).

Preferably, two or more first and second regions are arranged alternately alongside one another.

In accordance with one preferred exemplary embodiment, the multi-layer body is a security or valuable document, in particular a banknote or an ID document or a label for protecting goods, and thus furthermore also has a carrier substrate. The carrier substrate is thus formed for example by the paper substrate of a banknote.

In the case of such an embodiment of the multi-layer body, it has proved to be particularly advantageous to arrange the first and second layers on opposite sides of the carrier substrate. In accordance with one preferred exemplary embodiment of the invention, it is thus possible, for example, for a body comprising the first layer for example as transfer layer of a transfer film, in particular of a hot embossing film, to be applied to a first side of a transparent carrier substrate, for example the carrier substrate of a polymer banknote or of an ID document. A body comprising the second layer and the reflection layer is likewise applied by means of a transfer film, for example, to the opposite second side of the carrier substrate. Furthermore, it is also possible for a body comprising the second layer and the reflection layer or the first layer to be applied, in particular to be applied as transfer layer of a transfer film, to a laminate comprising a carrier film and the first layer or the second layer and the reflection layer. Furthermore, it is also possible for the second layer or the first layer to be impressed onto a laminate comprising a carrier film and the first layer or the second layer and the reflection layer, directly into the surface of the laminate, in particular by means of a mechanically acting embossing roller or an embossing stamp for producing a surface relief. The surface relief can also be introduced directly by other effects, e.g. by laser ablation. This has the effect that the not inconsiderable layer thickness of the carrier substrate increases the distance between the first layer and the reflection layer and, consequently, the optical appearance of the optically variable effect generated by the multi-layer body can be improved further, as mentioned above.

Preferably, the carrier substrate in this case has a transparent window, which is arranged at least partly in superimposition with respect to the first, second and/or further regions of the multi-layer body.

However, the multi-layer body can furthermore also be embodied as a transfer film or lamination film and be applied in this form for example to the carrier substrate of a security or valuable document.

The invention is explained by way of example below on the basis of a number of exemplary embodiments with the aid of the accompanying drawings.

DETAILED DESCRIPTION OF THE INVENTION

Figure 1:
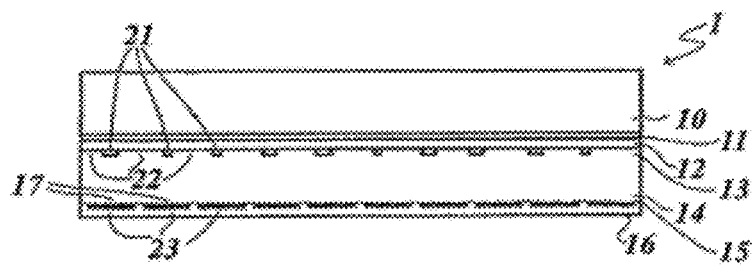
FIG. 1 shows a schematic sectional illustration of a multi-layer body.

FIG. 1 shows a schematic sectional illustration of a multi-layer body 1, which is a transfer film.

The multi-layer body 1 has a carrier film 10, a release layer 11, a protective lacquer layer 12, a partial metal layer 13, a replication lacquer layer 14, a metal layer 15 and an adhesive layer 16.

The carrier film 10 consists of a plastic film, which preferably has a layer thickness of between 6 and 125 μm and which preferably consists of PET (polyethylene terephthalate), PEN (polyethylene naphthalate) or BOPP (biaxially oriented polypropylene). The release layer 11 is applied to the carrier film preferably by means of a printing method.

The release layer 11 preferably contains wax components and enables the carrier film 10 to be separated after the application of the transfer layers consisting of the layers 11 to 16 on the target substrate. The release layer 11 could also be dispensed with here if the carrier film 10 and the protective lacquer layer 12 are chosen with regard to their material properties such that the adhesion forces between these layers are lower than the adhesion forces between the subsequent layers and the carrier film 10 can thus be released from the protective lacquer layer 11 without the underlying layer element being destroyed.

The protective lacquer layer 12 is then preferably applied to the release layer 11 by means of a printing method.

The protective lacquer layer 12 is a transparent lacquer layer having a layer thickness of preferably between 1 and 3 μm. The protective lacquer layer 12 could also be dispensed with.

The metal layer 13 has zones 21 in which the metal of the metal layer is provided, and zones 22 in which the metal of the metal layer is not provided. In order to produce the partial metal layer 13, preferably a whole-area metal layer is applied to the protective lacquer layer 12 by vapor deposition or sputtering, for example. The metal of the metal layer is subsequently removed again in the zones 22. This can be realized for example by applying an etchant by printing in the zones 22, by applying an etching resist by printing in the zones 21 and subsequently removing the metal layer 13 in the region not protected by the etching resist in an etching bath, by means of an ablative method, for example by laser ablation, or by applying, exposing, and developing a photoresist and subsequently removing the metal layer in the region not protected by the developed photoresist.

In this case, the layer thickness of the metal layer 13 is preferably between 10 nm and 200 nm.

The first zones 21 are shaped in the form of microimages having a smallest dimension of less than 100 μm, preferably of less than 50 μm. This is explained by way of example with reference to the figures in FIG. 2b and FIG. 3b. The figures in FIG. 2b and FIG. 3b show, by way of example, two different configurations of the metal layer 13 in a region 31 and in a region 32, respectively. Smallest dimension means in particular in FIG. 3b that this smallest dimension is taken to mean the compressed, smallest extent of the microimages, which, in the non-compressed extent, can be considerably larger than the smallest dimension.

Smallest dimension of a zone, of an image or of a microimage is therefore understood to mean the dimension selected from length and width which is the smaller. In the case of relatively complex shapings, in order to determine the width and length, a corresponding virtual rectangle is determined, which is chosen such that the complex shaping is arranged within the rectangle and as many of the boundary lines of the relatively complex shaping as possible touch the edges of the rectangle.

In the region 31, a multiplicity of zones 21 are provided, which are in each case shaped in the form of a microimage representing the symbol "∈". In this case, the first zones 21 are surrounded by a second zone 22, which forms the background and in which the metal of the metal layer 13 is not provided. Consequently, in the region 31, the layer 13 is composed of a multiplicity of zones 21 in which the metal of the metal layer is provided and the layer 13 is thus opaque and reflective, and of a zone 22 in which the metal of the metal layer 13 is not provided and the layer 13 is thus transparent. The microimages formed by the first zones 21 in the region 31 are arranged in accordance with a two-dimensional microimage grid, wherein the microimage grid spans a coordinate system having a coordinate axis 53 and a coordinate axis 54 at right angles thereto. In the case shown in FIG. 2b, the adjacent microimages have a microimage distance 63 in the direction of the coordinate axis 53 and a microimage distance 64 in the direction of the coordinate axis 54. In this case, microimage distance is understood to mean the distance between the area centroids of the adjacent zones 21. The microimage distance 63 and the microimage distance 64 are chosen for the microimage in the region 31 such that it is in each case <300 μm. The microimage distance 63 and/or the microimage distance 64 can be constant in each case for the mutually adjacent microimages arranged in the region 31, such that the microimage grid has a constant grid width in the direction of the coordinate axis 53 and/or 54 (where the microimage distances 63 and 64 can be different). However, it is also possible for the microimage distances 63 and 64 between adjacent microimages to differ in the region 31, as also explained further below.

In the exemplary embodiment according to FIG. 3b, in the region 32, the zones 21 are embodied in the form of microimages which have a distorted shaping and which are arranged in accordance with a one-dimensional grid that spans a coordinate system having a coordinate axis 57 and a coordinate axis 58 at right angles thereto. In this case, the zones 21 are surrounded by the zones 22, which fill the regions not occupied by black color in FIG. 3b, such that the layer 13 in the region 32 consists of the zones 21 and the zones 22. As indicated in FIG. 3b, in the case of the one-dimensional microimage grid, a sequence of microimages is provided only in one spatial direction, namely in the direction of the coordinate axis 57. In this case, adjacent microimages are spaced apart at a microimage distance 67 from one another, wherein the microimage distance 67 for the microimages of the region 32 can be constant in each case, such that the grid has a constant grid width. However, it is also possible for the microimage distance 67 between adjacent microimages in the region 32 to be different, wherein the microimage distance 67 should, however, be chosen in each case to be <300 μm.

The microimages in the region 32 have a width of less than 100 μm, preferably of 10 μm to 50 μm. The length of the microimages, i.e. in the case shown in FIG. 3b the extent of the microimages along the coordinate axis 58 is chosen to be >300 µm and is preferably more than 2 mm. As indicated in FIG. 3b, the microimages in the region 32 consist of microimages which have been extended by more than 10-fold, for example have been extended by 50- to 100-fold, by the extension of the longitudinal axis of a basic image relative to the transverse axis of a basic image by a transformation function.

Subsequently, the replication lacquer layer 14 is then applied, preferably printed, or coated over the whole area, onto the film body comprising the layers 10, 11, 12 and 13. The replication lacquer layer 14 has a layer thickness of 2 µm to 50 µm, with further preference of 5 µm to 20 µm. Moreover, it is also possible for the layer 14 to consist of a plurality of layers. Thus, it is possible, for example, for the layer 14 to have a core layer having a layer thickness of 20 µm, for example, and a lacquer layer applied thereto, which then serves as the actual replication lacquer layer, into which microstructures 17 are impressed. In this case, the core layer can also consist of a transparent plastic film, in particular a transparent polyester film. This embodiment is advantageous in particular for forming layers 14 having a layer thickness of more than 20 µm.

The microstructures 17 are in each case impressed into that surface of the replication lacquer layer 14 which faces away from the layer 13, that is to say into the interface between the replication lacquer layer 14 and the metal layer 15, in zones 23, as is shown by way of example in FIG. 1. The replication lacquer layer 14 is, for example, a layer composed of a transparent, thermoplastic lacquer, in which the microstructures 17 are impressed under the action of heat and pressure by means of a corresponding embossing stamp. Furthermore, it is also possible for the replication lacquer layer 14 to consist of a transparent UV-curable lacquer, into which the microstructures 17 are impressed by UV replication.

In the zones 23, the microstructures 17 are covered with the metal layer 15, which has a layer thickness of preferably 10 nm to 3 µm in the region of the zones 23. In this case, the design of the microstructures 17 in the zones 23 is in each case chosen such that it reflects back and/or diffracts back light incident perpendicularly with respect to the plane spanned by the first layer 13 from the direction of the layer 13 in the region of the respective third zone 23 onto a region of the layer 13 whose area is smaller than the area of the respective zone 23 by at least a factor of 10 to 20 (the layer thickness of the layer 13 is negligible in comparison with the length/width thereof, such that the layer 13 spans a plane).

Figure 2A:
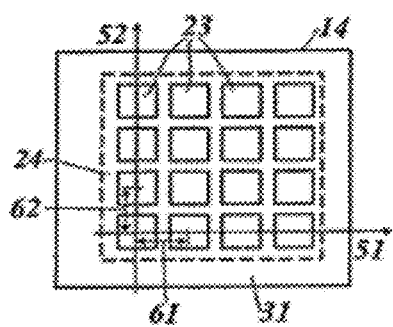
FIG. 2a shows a schematic plan view of a layer of the multi-layer body according to FIG. 1.
Figure 2B:
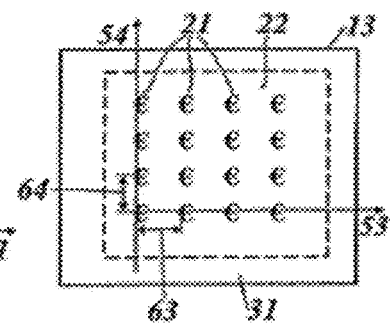
FIG. 2b shows a schematic plan view of a layer of the multi-layer body according to FIG. 1.
Figure 3A:
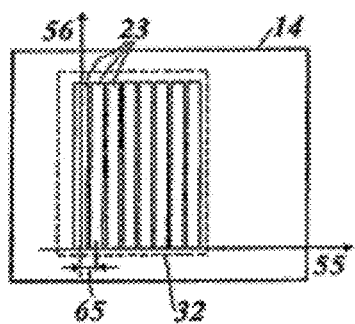
FIG. 3a shows a schematic plan view of a layer of the multi-layer body according to FIG. 1 in accordance with a further exemplary embodiment.
Figure 3B:
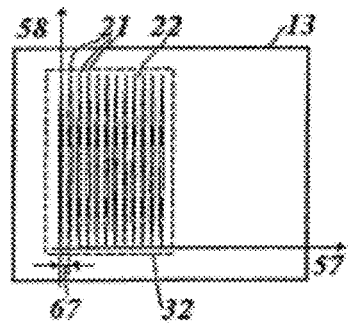
FIG. 3b shows a schematic plan view of a layer of the multi-layer body according to FIG. 1 in accordance with a further exemplary embodiment.

The zones 23 and thus the microstructures 17 are arranged in accordance with a microstructure grid with a distance between adjacent microstructures of less than 300 µm, as shown by way of example in FIG. 2a and FIG. 3a.

FIG. 2a shows the configuration of the layer 14 in the region 31 and FIG. 3a shows the configuration of the layer 14 in the region 32. In the region 31, the zones 23 and thus the microstructures 17 are arranged in accordance with a two-dimensional microstructure grid that spans a coordinate system having a coordinate axis 51 and a coordinate axis 52 at right angles thereto. In the case of this two-dimensional grid, the zones 23 and thus the microstructures 17 follow one another both in the direction of the coordinate axis 51 and in the direction of the coordinate axis 52. Adjacent microstructures are spaced apart at a microstructure distance 61 from one another in the direction of the coordinate axis 51, and adjacent microstructures are spaced apart at a microstructure distance 62 from one another in the direction of the coordinate axis 52. In this case, microstructure distance is understood to mean the distance between the area centroids of the adjacent zones 23 in which the respective microstructures 17 are provided.

In the region 32, the microstructures are arranged in accordance with a one-dimensional microstructure grid that spans a coordinate system having a coordinate axis 55 and a coordinate axis 56 at right angles thereto. In the case of the one-dimensional microstructure grid, the regions 23 and thus the microstructures 17 follow one another only in the direction of the coordinate axis 55, adjacent microstructures having a microstructure distance 65.

For the rest, the explanation already given above with regard to the microimage distances 63, 64 and 67 is applicable with regard to the microstructure distances 61, 62 and 65.

The microstructures 17 are preferably diffractive structures. In this case, the microstructures 17 in the region 31 preferably consist of microstructures whose spatial frequency has a minimum in the area centroid of the respective zone 23 and increases continuously in all directions, i.e. both in the direction of the coordinate axis 51 and in the direction of the coordinate axis 52, with increasing distance from the area centroid. The average spatial frequency of the microstructure 17 in the region of the area centroid (in 5% of the area of the respective zone 23) is preferably between 0.1 line/mm and 50 lines/mm and in the edge regions 23 between 100 lines/mm and 2000 lines/mm. Moreover, it is also possible that the microstructures 17 are not composed of identical structure elements, for example rectangular structure elements, rather the structure elements of the microstructures 17 differ in the region of the zones 23 and thus, by way of example, the flank inclination flank oriented toward the area centroid of the respective zone 23 has a flank inclination which has a minimum in the region of the area centroid and increases continuously in the direction of the edge regions of the respective zone 23, thus increases continuously both in the direction of the coordinate axis 51 and in the direction of the coordinate axis 52 proceeding from the area centroid of the respective zone 23. Furthermore, it is also possible for the microstructure 17 to be formed by a kinoform or a microstructure which acts substantially in reflection and which has the imaging properties described above. Furthermore, it is also possible for the microstructure 17 to be formed by Fresnel zone plates having the imaging properties described above.

The structure depth of the microstructure 17 is between 100 nm and 30 µm, preferably between 1 µm and 20 µm.

As already mentioned above, the coordinate axes 51, 52, 53, 54, 55 and 57 define the spatial direction in which the zones 21 and 23 succeed one another. In this case, it is also possible that the coordinate axes 51 to 58, in contrast to what is indicated in the figures in FIGS. 2a to 3b, do not have the form of straight lines, rather they can also have any other linear shaping, thus they can be embodied for example in wavy line-shaped or circular fashion. The zones 21 and 23 then also succeed one another correspondingly.

The coordinate axes 53 and 51 and also 54 and 52 and also the coordinate axes 55 and 57 are preferably oriented parallel to one another (within the scope of manufacturing tolerances). However, it is also possible for these coordinate axes to form an angle of between 0° and 5° with respect to one another. Independently of the position of the coordinate axes 51 to 58, the distance between adjacent microstructures and adjacent zones 21 are chosen such that the microstructure distance between adjacent microstructures and the microimage distance between adjacent microimages, which are arranged adjacent to said microstructures, differ in at least one spatial direction in the region 31 or 32 by not more than 10%.

In the case of the above-described orientation of the coordinate axes 51 to 57 with respect to one another, it is advantageous if the microstructure distance 61 differs from the microimage distance 63, the microstructure distance 62 differs from the microimage distance 64 and the microstructure distance 65 differs from the microimage distance 67 for microimages/microstructures arranged adjacent by not more than 10%, preferably between 0.1 and 5%.

The microimages and the microstructures can be identical in the regions 31 and 32. However, it is also possible for the microimages and the microstructures to be different in the regions 31 and 32. In this case, it is particularly advantageous if the microimages/microstructures change continuously in the course of the region 31 or 32. Thus, the shaping of the microimages can change continuously for example in accordance with a transformation function of a basic image comprising rotation and/or magnification or reduction of the basic image and, in the case of the configuration according to FIG. 3b, subsequent distortion in a manner dependent on the coordinates of the coordinate axes 53, 54, 57 and 58 in the region 31 or 32. Likewise, the microstructures 17 can be chosen in the zones 23 such that the regions of the layer 13 onto which the light incident from the direction of the first layer in the region of the respective zone 23 is reflected back and/or diffracted back differs from one another in terms of their area, width and/or length, in particular in a manner determined likewise by a transformation function dependent on the coordinates of the coordinate axis 51 and 52 or 55. By virtue of this measure, when the multi-layer body 1 is tilted, it is possible to obtain interesting movement, magnification and reduction effects of motifs having a (three-dimensional) effect, which become visible upon observation by the human observer when the multi-layer body 1 is tilted.

It is thus possible, for example, to obtain the following optical effects: it is possible to generate a flip effect, for example, which involves changing between two images, for example an open and a closed eye or a ∈ symbol and a number, during forward and backward tilting. If the multi-layer body is tilted about another axis, for example from left to right, an additional movement effect is manifested.

Furthermore, it is possible to generate a movement or transformation effect, for example: if the multi-layer body is tilted, then a movement, for example a rotating propeller, a running person or moving clouds, is visible.

Figure 4:
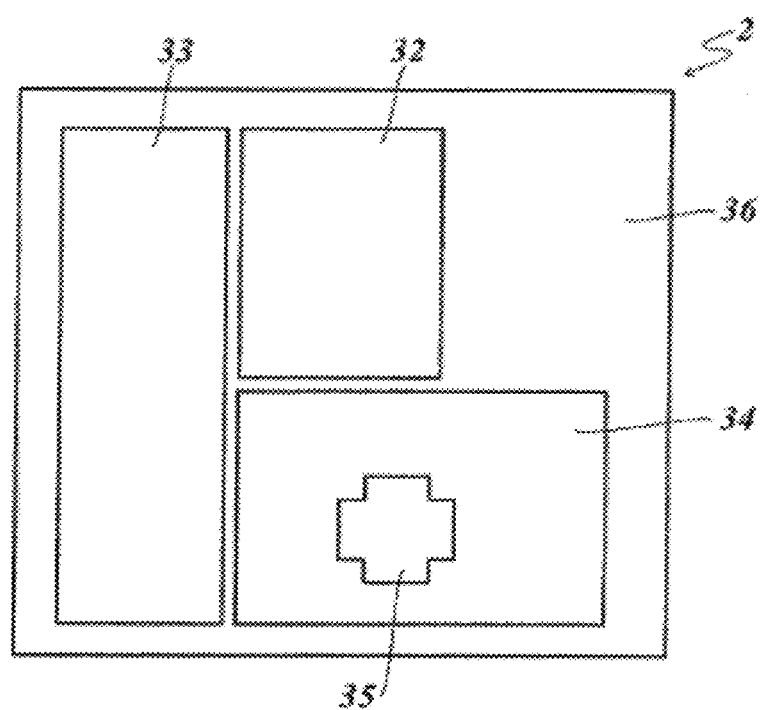
FIG. 4 shows a schematic plan view of the multi-layer body according to FIG. 1 in accordance with a further exemplary embodiment.

Furthermore, it is also possible for regions in which the microimage grid and microstructure grid determined by the zones 21, 22 and 23 differ from one another to be arranged alongside one another adjacent to one another. Thus, FIG. 4 shows a plan view of a multi-layer body 2 comprising the regions 32, 33 and regions 34 and 35. In the regions 32 to 35, the microimage grid and the microstructure grid in each case differ from one another, in particular in one of the parameters chosen from the group microimage distance, microstructure distance and orientation of the coordinate axis spanned by the microstructure grid and the microimage grid. The microimage grid or the microstructure grid can also be identical in individual regions 32 to 35, but phase-shifted in relation to the respective other regions. In the regions 34 and 35, by way of example, the zones 21, 22 and 23 are thus arranged in accordance with a microstructure grid and a microimage grid in which the difference in the microimage distance and the microstructure distance is positive in the region 34 and negative in the region 35. A contrary movement of the motif manifested during tilting in the regions 34 and 35 is brought about as a result. In addition, an advantageous combination of regions having movement effects with adjacent static regions is possible, in order to serve as an optical reference for the movement effect. By way of example, that can be movement effects in the regions 32 to 35 and a static surrounding region 36 or a movement effect in the region 35 with a region 34 surrounding the latter without a movement effect.

Figure 5:
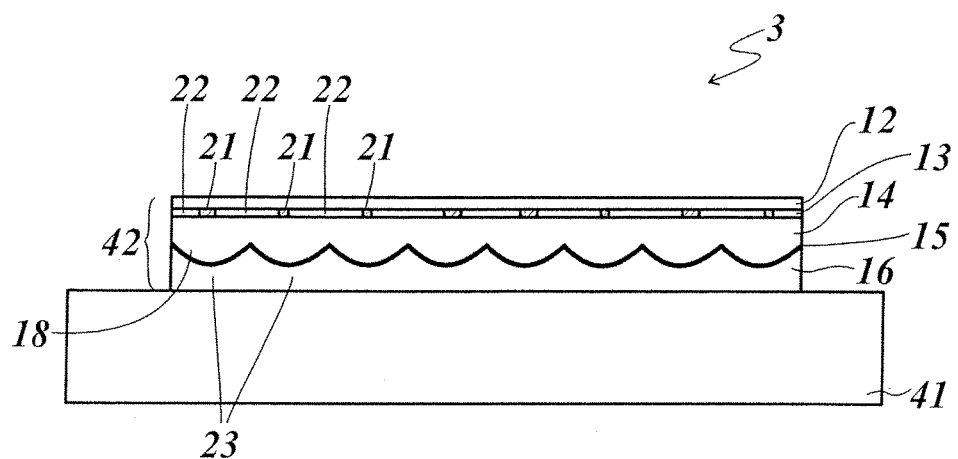
FIG. 5 shows a schematic sectional illustration of a multi-layer body in accordance with a further exemplary embodiment.

FIG. 5 shows a multi-layer body 3 forming a valuable document, for example a banknote. The multi-layer body 3 has a carrier substrate 41 and also the layer 12, 13, 14, 15 and 16 according to FIG. 1. The layers 12, 13, 14, 15, 16 form a film element 42, which is applied to the carrier substrate 41 for example by means of the transfer film shown in FIG. 1. The microstructures 17 according to FIG. 1 are replaced, in the multi-layer body 3 according to FIG. 5, by microstructures 18 which have the deflection properties explained above with regard to the microstructures 17, but act substantially in reflection. In the embodiment shown in FIG. 5, the microstructures 18 are configured as freeform areas having a reflectivity action which form, in particular, curved concave mirrors and thereby generate, in particular, a magnification, reduction or distortion effect with regard to the microimage grid 21, 22. The microstructures 18 can have a semicylindrical (as illustrated in FIG. 5), trapezoidal or else triangular cross section or profile form.

It may be provided that the microstructures embodied as freeform areas have smooth, specularly reflective surface regions and/or surface regions having a diffractive action. The diffractive surface regions can be arranged as a pattern on an otherwise smoothly specularly reflective surface region as background or on a surface region having a diffractive structure that is different from the pattern, and thus form a motif. By way of example, the adjacent flanks of a shaped microstructure that is semicylindrical, trapezoidal or else triangular in cross section or profile can have different diffractive motifs, as a result of which an image change effect can be generated at different viewing angles. In this case, the relief depth of the microstructures 18 is preferably between 3 µm and 50 µm, with further preference between 3 µm and 30 µm. For the rest, the configuration of the layers 12 to 16 and also the arrangement and position of the layers 12 to 16 with respect to one another correspond to the explanation given above with regard to the figures in FIG. 1 to FIG. 4.

Figure 6:
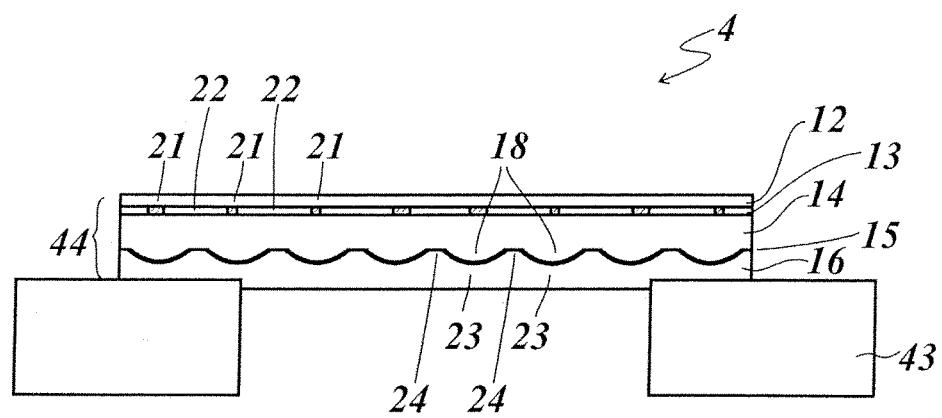
FIG. 6 shows a schematic sectional illustration of a multi-layer body in accordance with a further exemplary embodiment.

FIG. 6 shows a further multi-layer body 4, which is likewise a security or valuable document. The multi-layer body 4 has a carrier substrate 43 having a transparent window in the form of a perforation 45. A film element 44 comprising the layers 12, 13, 14, 15 and 16 is applied in the region of the window-shaped perforation 45. The construction of the film element 44 corresponds to the construction of the film element 42 with the difference that the metal layer 15 is not provided over the whole area, but rather in the region of the zones 23, and zones 24 in which the metal of the metal layer 15 is not provided are provided between the zones 23. In the region of the zones 24, the film element 44 and hence the multi-layer body 4 are embodied in transparent fashion, such that further optically variable effects are manifested upon viewing in transmitted light.

Figure 7:
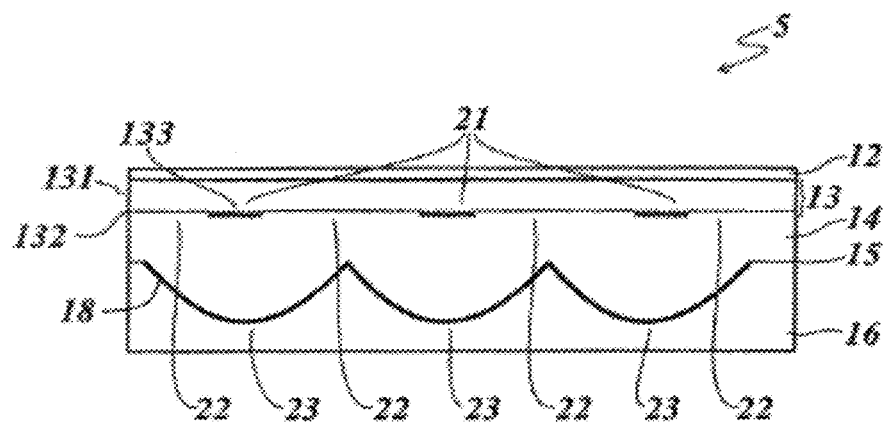
FIG. 7 shows a schematic sectional illustration of a multi-layer body in accordance with a further exemplary embodiment.

FIG. 7 shows a multi-layer body 5 comprising the layers 12, 13, 14, 15 and 16. The layers 12, 14, 15 and 16 are embodied as explained above with regard to these layers in the case of the figures in FIG. 1 to FIG. 4, with the difference that the microstructures 17 are replaced by the microstructures 18 according to FIG. 5 or FIG. 6. With regard to the configuration and arrangement of these layers, reference is therefore made to the explanations above.

In contrast to the layer 13 of the multi-layer body 1, the layer 13 is not formed by a single layer, but rather by two partial layers arranged one above the other, the partial layers 131 and 132. The partial layer 131 is a transparent replication lacquer layer, in which a relief structure 133 is impressed in the region of the zones 21. The partial layer 132 is a partial metal layer embodied like the layer 13 according to FIG. 1, that is to say that the metal of the metal layer 132 is provided in the zones 21 and not provided in the zones 22. The metal layer acts as a reflection layer for the relief structure 133. The partial layer 132 can also be some other reflection-increasing layer or a layer which, with respect to the layer 131, has a refractive index deviating by at least 0.5, preferably by 1.0, as a result of which the relief structure 133 is visible in reflection through the light reflected at the partial layer 132.

Furthermore, it is also possible for the replication lacquer layer 131 to be dispensed with and for the relief structures 133 and also the microstructures 18 to be impressed into a common replication layer formed by the layer 14.

The relief structure 133 is preferably a diffractive structure, for example a hologram or a Kinegram® structure. The movement, reduction, magnification and transformation effects that arise when the multi-layer body 5 is tilted are thus brought about for motifs which already per se convey an optically variable impression, such that very impressive and distinctive security features can be provided with the multi-layer body 5. The relief structure 133 can also have a structure having a refractive action, e.g. a structure shaped in a lens-like manner and having a semicylindrical, trapezoidal or triangular profile or cross section. The relief structure 133 can also be a combination or a superimposition of a diffractive fine structure with a refractive coarse structure, wherein the fine structure and the coarse structure can have grid pitches deviating from one another. The fine structure and the coarse structures can be impressed in separate (combination) replication lacquer layers or in a common (superimposition) replication lacquer layer. Preferably, the deviation of the grid pitches is comparatively large; by way of example, the fine structure has a grid pitch similar to the microstructure grid, whereas the coarse structure has a grid pitch that is larger than the microstructure grid approximately by a factor of 1.5 or 2 or 3. If the coarse structure is applied as area pattern above the grid of the fine structure, it is thus possible to define patterned, in particular macroscopic area regions in which coarse structure, fine structure and microstructures 18 are superimposed differently and can thereby exhibit different optical effects.

Figure 8:
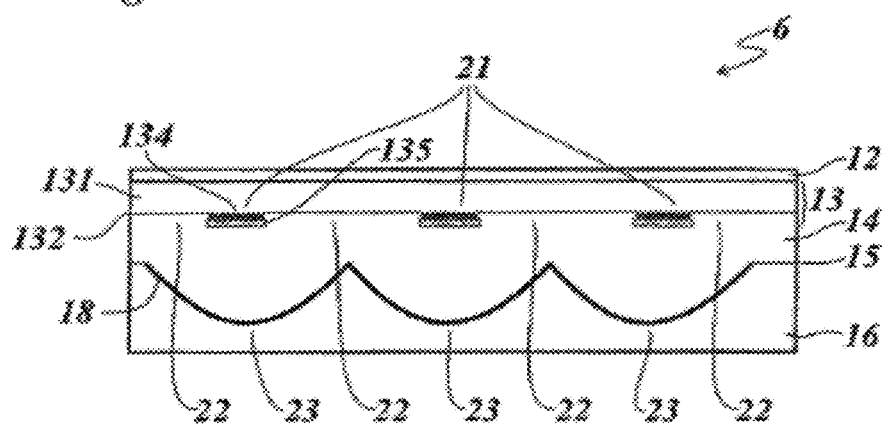
FIG. 8 shows a schematic sectional illustration of a multi-layer body in accordance with a further exemplary embodiment.

FIG. 8 shows a multi-layer body 6 having the layers 12, 13, 14, 15 and 16. The layers 12 to 16 correspond rather in terms of their construction and their arrangement to the layers 12 to 16 according to FIG. 7, with the difference that the layer 13 has a partial layer 135 alongside the partial layers 131 and 132 and a relief structure 134 differing from the relief structure 133 is impressed into the partial layer 131. The layer 135 is a reflective cover layer, for example a reflective color layer, which is provided in the region of the zones 21 and is not provided in the region of the zones 22. What is brought about by this layer is that the optical effect of the relief structures 134 is not brought about from the direction of the layer 14, and so the optical effect of the relief structures 134 merely forms a background for the optically variable effect (movement, reduction, magnification and transformation effects) formed by the multi-layer body 6. The relief structure 134 is preferably likewise formed by a hologram or a Kinegram® structure which is optically superimposed with the optically variable effect formed by the layer 135, 14 and 15. Furthermore, it is also possible for the relief structure 134 to be formed by a relief structure having a depth-to-width ratio of more than 0.5 and a spatial frequency of more than 1500 lines/mm, which has the effect that the light reflected back from the top side of the zones 21 is minimized and the contrast and the luminous intensity of the optically variable effect generated by the multi-layer body 6 is thus improved.

Figure 9:
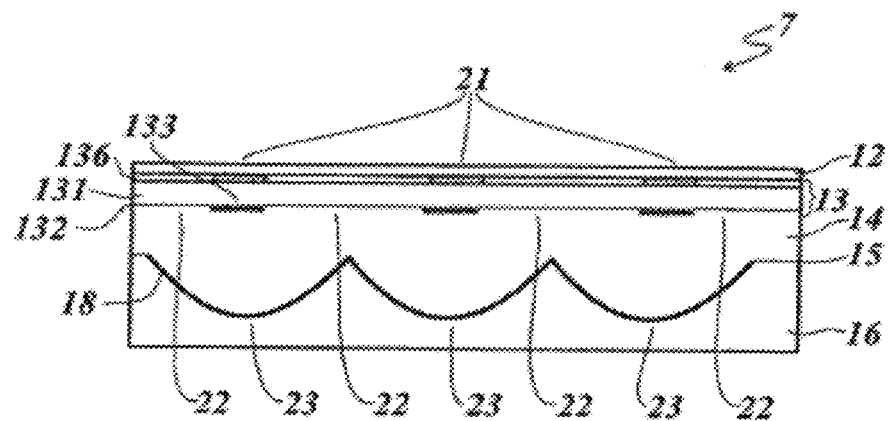
FIG. 9 shows a schematic sectional illustration of a multi-layer body in accordance with a further exemplary embodiment.

FIG. 9 shows a multi-layer body 7 having the layers 12, 13, 14, 15 and 16. The layers 12, 13, 14, 15 and 16 are embodied like the layers 12, 13, 14, 15 and 16 according to FIG. 7, with the difference that the layer 13 also comprises the partial layer 136 alongside the partial layers 131 and 132. With regard to the configuration and arrangement of these layers, reference is therefore made to the explanation above. The partial layer 136 is formed by a covering layer, for example a color lacquer layer, wherein the covering layer, for example the color lacquer, is provided in the zones 21 and is not provided in the zones 22. This prevents the optical effect generated by the relief structure 133 in the zones 22 from being visible on the top side of the layer 13 and thus only influencing the motifs generated by the layers 131, 132, 14 and 15.

Figure 10:
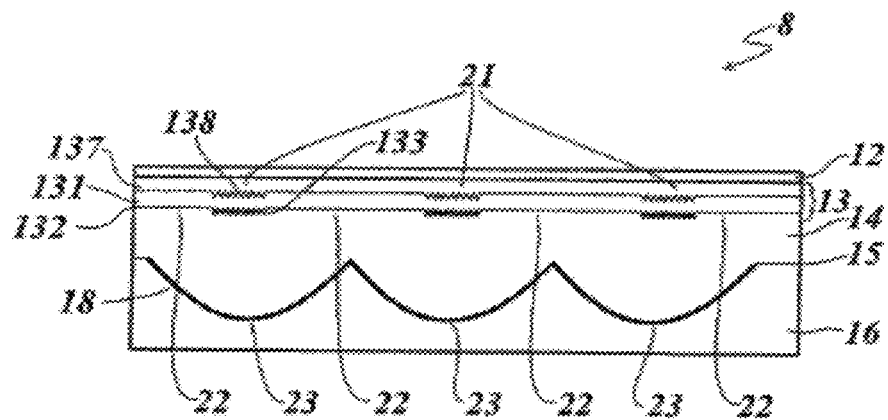
FIG. 10 shows a schematic sectional illustration of a multi-layer body in accordance with a further exemplary embodiment.

FIG. 10 shows a multi-layer body 8 comprising the layers 12, 13, 14, 15 and 16. The layers 12, 13, 14, 15 and 16 are embodied like the layers 12, 13, 14, 15 and 16 according to FIG. 7, with the difference that the layer 13 has the partial layer 137 alongside the partial layers 131 and 132. With regard to the configuration and arrangement of the layers 12, 13, 14, and 16, reference is therefore made to the explanation above.

The partial layer 137 consists of a replication lacquer layer and a reflective layer provided in the region of the zones 21, wherein, in the region of the zones 21, a relief structure 138 is furthermore impressed into the boundary layer between the replication lacquer layer and the reflection layer. Furthermore, it is also possible for the relief structure 138 to be impressed into the top side of the partial layer 131 and for the partial layer 137 to consist of a metal layer, wherein the metal of the metal layer is provided in the zones and is not provided in the zones 22. The relief structures 133 and 138 are preferably different diffractive structures, for example different holograms and/or Kinegram® structure.

In the case of the film body 8, the relief structure 138 firstly brings about an optically variable background effect against the optically variable effect brought about by the layers 131, 132, 14 and 15 (superimposition) and secondly generates the optically variable effect already explained with reference to FIG. 7, in the case of which the optically variable effect generated by the structuring of the layer 13 and the layers 14 and 15 is already based on an optically variable motif as basic motif.

Figure 11:
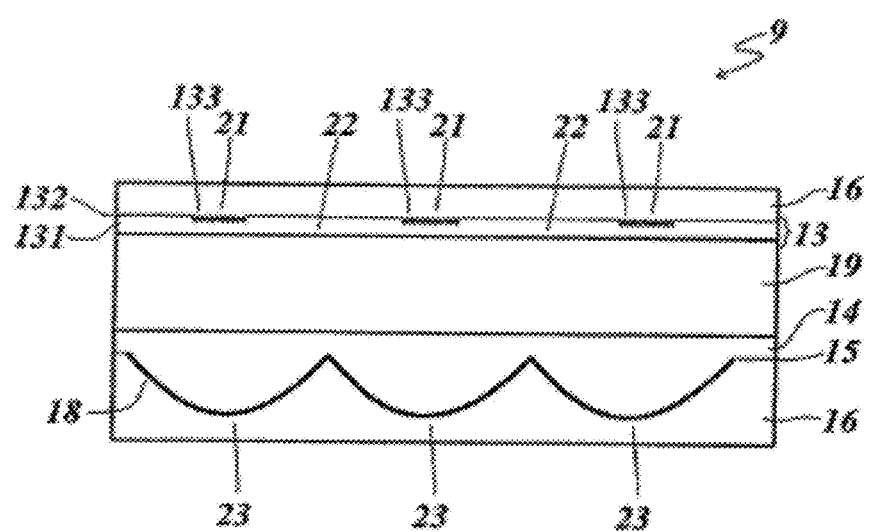
FIG. 11 shows a schematic sectional illustration of a multi-layer body in accordance with a further exemplary embodiment.

FIG. 11 shows a multi-layer body 9 comprising the layers 16, 13, 14, 15 and 16 and also a layer 19, which is a carrier film consisting of plastic, in particular a polyester film. The carrier film 19 preferably has a thickness of between 6 and 100 µm, in particular of from approximately 20 µm to 50 µm.

The layers 16, 13, 14, 15, 16 are embodied as explained in the case of FIG. 7 and reference is made to the above explanations in regard thereof.

In this embodiment, the carrier film 19 is covered on both sides with replication lacquer layers, the layers 14 and 131. The microstructures 18 and, in the zones 21, relief structures 133 are respectively impressed into the replication lacquer layers 14 and 131. Furthermore, the microstructures 18 are covered with a metallic reflection layer 15 and the relief structures 133 in the zones 21 are covered with the metal of the partial metal layer 132. The multi-layer body thus formed is then provided with the adhesive layer 16 on both sides.

The resultant film body 9 is distinguished by particular robustness and can be introduced for example as a security thread or security strip into the carrier substrate of a banknote, for example into the banknote paper, by the known methods. After the film body 9 has been introduced into the carrier substrate of the banknote, it can be removed again from the carrier substrate only with difficulty without destroying the carrier substrate and the film body 9, with the result that the securely arising security document has high security against forgery.

Figure 12A:
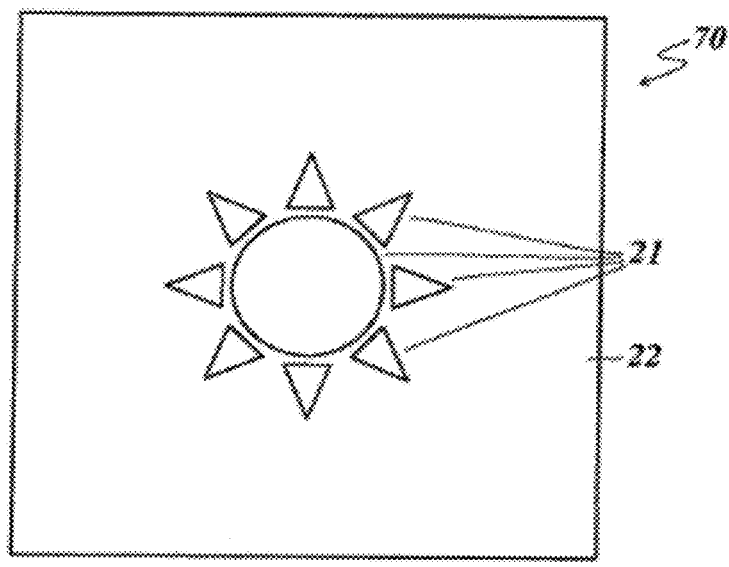
FIG. 12a shows a schematic plan view of a multi-layer body.
Figure 12B:
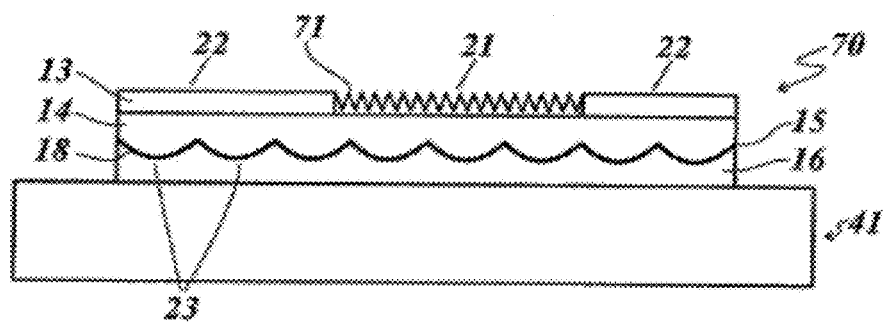
FIG. 12b shows a schematic sectional illustration of a multi-layer body.

Moreover, the film body 9 according to FIG. 11 can also be embodied as a transfer film, for example. For this purpose, the upper adhesive layer 16, that is to say the adhesive layer 16 located above the layer 13, is replaced by the layers 10 to 12 according to FIG. 1, that is to say that the layer 13 is followed by the optional protective lacquer layer 12, the release layer 11, and also the carrier film 10. FIG. 12 and FIG. 12b illustrate the basic construction of a further multi-layer body 70. FIG. 12b shows a multi-layer body 70 applied on a carrier substrate 41 of, for example, a banknote. The multi-layer body 70 has a layer 13, a replication lacquer layer 14, a metal layer 15 and an adhesive layer 16. The microstructures 18 are impressed in zones 23.

The layers 14, 15 and 16 and also the microstructures are embodied as described above with reference to the previous figures in FIG. 1 to FIG. 11, wherein the microstructures 18 can also be replaced by the microstructures 17 described above. With regard to the details of the possible configurations of these layers, reference is thus made to the previous explanations.

The layer 13 is a transparent replication lacquer layer. Said layer has zones 21 and zones 22. The zones are shaped in the form of images which represent partial images of the overall image shown in FIG. 12a. In this case, the zones 21 have a smallest dimension of more than 300 μm, preferably of more than 3 mm, and are therefore visible to the human observer.

In the zones 21, as indicated in FIG. 12b, structures 71 are impressed into the layer 13. The structures 71 can be the same structures as described above with regard to the microstructures 17 and 18 and also the relief structures 133 and 134.

Figure 13:
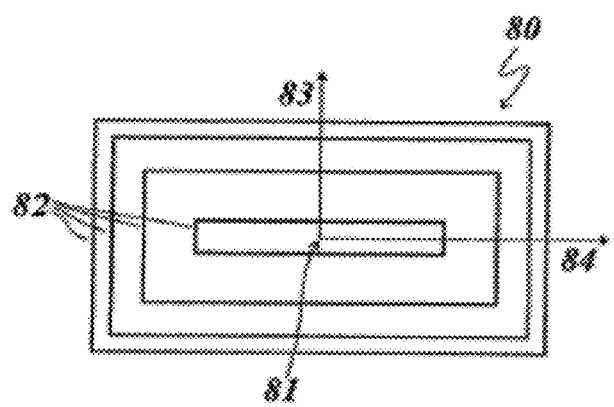
FIG. 13 shows a schematic plan view of a structure for a multi-layer body.

Preferably, the structures 71 are in this case a diffractive structure, the spatial frequency of which varies over the area region of the respective zone 21. In this case, the variation of the spatial frequency is preferably chosen in the manner illustrated in FIG. 13:

FIG. 13 shows a schematic plan view of a structure 80, which fills a rectangularly shaped zone 21. The lines 82 illustrate the line of extreme values of the structure 80, such that the respective local spatial frequency of the structure 80 results from the distance between the lines 82. Furthermore, the area centroid 81 of the zone 21 is marked in FIG. 13. Proceeding from the area centroid 81, therefore, the spatial frequency of the structure 80 increases—as is evident from FIG. 13—therefore in all spatial directions and also in the spatial directions 83 and 84. As shown in FIG. 13, this increase in the spatial frequency is in this case advantageously chosen such that the lines 82, i.e. the extreme values of the relief structure 82, are oriented parallel to one another.

Figure 14:
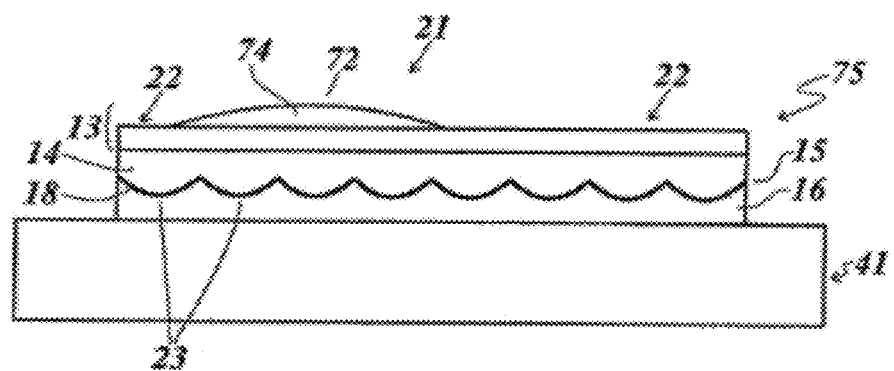
FIG. 14 shows a schematic sectional illustration of a multi-layer body.

FIG. 14 shows a multi-layer body 75 applied on the substrate 41. The multi-layer body 75 is constructed like the multi-layer body 70 according to FIG. 12b, apart from the fact that the layer 13 here has a transparent lacquer layer and a transparent layer 74 printed thereon. In this case, the layer 74, having a relief structure 72, is printed onto the underlying layers of the multi-layer body 75 in such a way that the surface of said layer 74—as shown in FIG. 14—has a lens-type shaping in the zones 21.

Furthermore, it is particularly advantageous if the transparent layer 13 is colored in the zones 21 or has a reduced or increased transparency relative to the zones 22 and the layer 13, in the zones 21 and in the zones 22, thus has a different filter effect in the range of light visible to the human eye.

The invention claimed is:

1. A multi-layer body comprising:
a first layer having a multiplicity of opaque and/or reflective first zones, which are respectively separated from one another by one or a plurality of transparent second zones, wherein the first zones are shaped as micro images having a smallest dimension of less than 100 μm and are arranged in accordance with a micro image grid having a distance between adjacent micro images in a first spatial direction of less than 300 μm, wherein the micro image grid spans a first coordinate system having a coordinate axis x1 and a coordinate axis y1 at right angles thereto;
a second layer composed of a transparent material, said second layer being arranged below the first layer; and
a reflection layer arranged below the second layer,
wherein the second layer has a multiplicity of third zones, which are respectively separated from one another by one or a plurality of transparent fourth zones, each of the third zones having a microstructure impressed into the interface—facing away from the first layer—between the second layer and the reflection layer, which is covered with the reflection layer, and the reflection layer is not provided in the one or plurality of transparent fourth zones, and
wherein each of the microstructures is configured such that it reflects back and/or diffracts back light incident perpendicularly with respect to the plane spanned by the first layer from the direction of the first layer in the region of the respective third zone onto a focus region of the first layer, the focus region having an area smaller than the area of the respective third zone by at least a factor of 10, and
wherein the microstructures are arranged in accordance with a microstructure grid having a distance between adjacent microstructures in a second spatial direction of less than 300 μm, which microstructure grid spans a second coordinate system having a coordinate axis x2 and a coordinate axis y2 at right angles thereto, and
wherein, in a first region of the multi-layer body, the microimages of the microimage grid and the microstructures of the microstructure grid are arranged in overlapping fashion in a fixed position with respect to one another and the microstructure distance determined by the distance between the area centroids of adjacent third zones and the microimage distance determined by the distance between the area centroids of adjacent first zones differ from one another in at least one third spatial direction in the first region by not more than 10%, and
wherein, in the first region, the area occupied by the first zones is smaller than the area occupied by the third zones by at least a factor of 4, and wherein at least one of the micro image grid and the microstructure grid is a one-dimensional grid in the first region, and
wherein the longitudinal axis of the micro images is extended relative to the transverse axis of the micro images by more than 10-fold by a transformation function.

2. The multi-layer body as claimed in claim 1, wherein, in the first region, the area proportion constituted by the first zones in the total area of the first and second zones is between 20% and 10%.

3. The multi-layer body as claimed in claim 1, wherein, in the first region, the area occupied by the first zones is smaller than the area occupied by the third zones at least by a factor of 10 to 20.

4. The multi-layer body as claimed in claim 1, wherein, in the first region, the layer thickness of the second layer is between 5 and 150 μm.

5. The multi-layer body as claimed in claim 1, wherein, in the first region, the reflection layer is at a distance from the first layer of between 5 and 150 μm.

6. The multi-layer body as claimed in claim 1, wherein the microstructures are embodied in each case such that they reflect back and/or diffract back light incident perpendicularly with respect to the plane spanned by the first layer from the direction of the first layer in the region of the respective third zones onto a region of the first layer whose area is between 15 and 2500 times smaller, than the area of the respective third zone.

7. The multi-layer body as claimed in claim 1, wherein the microstructures are diffractive structures having a spatial frequency of more than 300 lines/mm.

8. The multi-layer body as claimed in claim 1, wherein the microstructures are in each case kinoforms.

9. The multi-layer body as claimed in claim 1, wherein the spatial frequency of the microstructures has a minimum in the region of the area centroid of the respective third zones and the spatial frequency of the microstructure increases in at least one spatial direction proceeding from the area centroid.

10. The multi-layer body as claimed in claim 1, wherein the flank inclination of that flank of the structure elements of the microstructure which is oriented in relation to the area centroid of the respective third zone increases in at least one spatial direction proceeding from the area centroid.

11. The multi-layer body as claimed in claim 1, wherein the local structure depth with which the microstructure is impressed into the second layer decreases in at least one spatial direction proceeding from the area centroid of the respective third zones.

12. The multi-layer body as claimed in claim 1, wherein the first layer is formed by a metal layer, wherein the metal of the metal layer is provided in the first zones and is not provided in the second zones.

13. The multi-layer body as claimed in claim 1, wherein a first diffractive surface structure is impressed in the lower interface—oriented toward the second layer—of the first layer in the first zones.

14. The multi-layer body as claimed in claim 13, wherein a second diffractive surface structure, which differs from the first diffractive surface structure, is impressed in the second zones.

15. The multi-layer body as claimed in claim 1, wherein the first layer consists of one or a plurality of partial layers, selected from the group comprising metal layer, HRI layer, replication lacquer layer, colored photoresist layer and color layer.

16. The multi-layer body as claimed in claim 1, wherein a third diffractive surface structure is impressed into the upper interface—facing away from the second layer—of the first layer or a partial layer of the first layer in the first zones.

17. The multi-layer body as claimed in claim 16, wherein the third surface structure is formed by a surface structure having a depth-to-width ratio of the structure elements of more than 0.5 and a spatial frequency of more than 2000 lines/mm.

18. The multi-layer body as claimed in claim 1, wherein a fourth layer is provided between the first and second layers, which is translucent or colored.

19. The multi-layer body as claimed in claim 1, wherein the coordinate axis y1 and the coordinate axis y2 and also the coordinate axis x1 and the coordinate axis x2 are respectively oriented parallel to one another in the first region and, in the first region, the microstructure distance and the microimage distance between adjacent microstructures and microimages differs by between 0.5 and 10% in the direction of at least one coordinate axis.

20. The multi-layer body as claimed in claim 1, wherein the coordinate axis y1 and the coordinate axis y2 and also the coordinate axis x1 and the coordinate axis x2 respectively form an angle of between 0.01° and 5° in the first region.

21. The multi-layer body as claimed in claim 1, wherein the grid pitch of the microimage grid and/or of the microstructure grid is constant in the first region.

22. The multi-layer body as claimed in claim 1, wherein the grid pitch of the microimage grid and/or of the microstructure grid changes continuously in at least one spatial direction in the first region.

23. The multi-layer body as claimed in claim 1, wherein the longitudinal axis of the microimages is oriented parallel to the coordinate axis x1.

24. The multi-layer body as claimed in claim 1, wherein the microimages of the microimage grid are in each case identical microimages in the first region.

25. The multi-layer body as claimed in claim 1, wherein the microstructures of the microstructure grid are in each case identical microstructures in the first region.

26. The multi-layer body as claimed in claim 1, wherein the first and/or second coordinate system are/is formed by a coordinate system having circular or wavy line-shaped coordinate axes.

27. The multi-layer body as claimed in claim 1, wherein the first region has a smallest area dimension of more than 3 mm.

28. The multi-layer body as claimed in claim 1, wherein the multi-layer body is a security document, a valuable document, or a banknote, and wherein the multi-layer body has a carrier substrate.

29. The multi-layer body as claimed in claim 28, wherein the first and second layers are arranged on opposite sides of the carrier substrate.

30. The multi-layer body as claimed in claim 28, wherein the carrier substrate has a transparent window in a third region, and wherein the first region and the third region at least partly overlap.

31. The multi-layer body as claimed in claim 1, wherein the multi-layer body is a transfer film or a lamination film.

32. A multi-layer body comprising:
a first layer having a multiplicity of opaque and/or reflective first zones, which are respectively separated from one another by one or a plurality of transparent second zones, wherein the first zones are shaped as micro images having a smallest dimension of less than 100

µm and are arranged in accordance with a micro image grid having a distance between adjacent micro images in a first spatial direction of less than 300 µm, wherein the micro image grid spans a first coordinate system having a coordinate axis x1 and a coordinate axis y1 at right angles thereto;

a second layer composed of a transparent material, said second layer being arranged below the first layer; and a reflection layer arranged below the second layer, wherein the second layer has a multiplicity of third zones, in each of which a microstructure is impressed into the interface—facing away from the first layer—between the second layer and the reflection layer, which is covered with the reflection layer, wherein each of the microstructures is configured such that it reflects back and/or diffracts back light incident perpendicularly with respect to the plane spanned by the first layer from the direction of the first layer in the region of the respective third zone onto a focus region of the first layer, the focus region having an area smaller than the area of the respective third zone by at least a factor of 10, and wherein the microstructures are arranged in accordance with a microstructure grid having a distance between adjacent microstructures in a second spatial direction of less than 300 µm, which microstructure grid spans a second coordinate system having a coordinate axis x2 and a coordinate axis y2 at right angles thereto, and wherein, in a first region of the multi-layer body, the micro images of the micro image grid and the microstructures of the microstructure grid are arranged in overlapping fashion in a fixed position with respect to one another and the microstructure distance determined by the distance between the area centroids of adjacent third zones and the micro image distance determined by the distance between the area centroids of adjacent first zones differ from one another in at least one third spatial direction in the first region by not more than 10%, and wherein, in the first region, the area occupied by the first zones is smaller than the area occupied by the third zones by at least a factor of 4, and wherein the grid pitches of the microimages and/or microstructures are constant in the direction of the coordinate axis y1 and/or y2 in the first region and the grid pitches of the microimages and/or microstructures varies in the direction of the coordinate axis x1 and/or x2 in a manner dependent on the coordinate y determined by the coordinate axis y1 and/or y2 and/or the coordinate x determined by the coordinate axis x1 and/or x2 in accordance with a function F (x, y), and wherein the micro images of the micro image grid, in the first region, are formed by micro images formed by a geometric transformation of a basic image comprising rotation and/or magnification or reduction of the basic image and optional subsequent distortion in accordance with a transformation function.

33. The multi-layer body as claimed in claim 32, wherein each of the third zones is surrounded by one or a plurality of fourth zones in which the reflection layer is not provided.

34. The multi-layer body as claimed in claim 33, wherein the multi-layer body is embodied in transparent fashion in the fourth zones.

35. The multi-layer body as claimed in claim 32, wherein the microimage grid and/or the microstructure grid are/is a two-dimensional grid in the first region.

36. A multi-layer body comprising:

a first layer having a multiplicity of opaque and/or reflective first zones, which are respectively separated from one another by one or a plurality of transparent second zones, wherein the first zones are shaped as micro images having a smallest dimension of less than 100 µm and are arranged in accordance with a micro image grid having a distance between adjacent micro images in a first spatial direction of less than 300 µm, wherein the micro image grid spans a first coordinate system having a coordinate axis x1 and a coordinate axis y1 at right angles thereto;

a second layer composed of a transparent material, said second layer being arranged below the first layer; and a reflection layer arranged below the second layer, wherein the second layer has a multiplicity of third zones, in each of which a microstructure is impressed into the interface—facing away from the first layer—between the second layer and the reflection layer, which is covered with the reflection layer, wherein each of the microstructures is configured such that it reflects back and/or diffracts back light incident perpendicularly with respect to the plane spanned by the first layer from the direction of the first layer in the region of the respective third zone onto a focus region of the first layer, the focus region having an area smaller than the area of the respective third zone by at least a factor of 10, and wherein the microstructures are arranged in accordance with a microstructure grid having a distance between adjacent microstructures in a second spatial direction of less than 300 µm, which microstructure grid spans a second coordinate system having a coordinate axis x2 and a coordinate axis y2 at right angles thereto, and wherein, in a first region of the multi-layer body, the micro images of the micro image grid and the microstructures of the microstructure grid are arranged in overlapping fashion in a fixed position with respect to one another and the microstructure distance determined by the distance between the area centroids of adjacent third zones and the micro image distance determined by the distance between the area centroids of adjacent first zones differ from one another in at least one third spatial direction in the first region by not more than 10%, and wherein, in the first region, the area occupied by the first zones is smaller than the area occupied by the third zones by at least a factor of 4, and wherein at least two microstructures of the microstructure grid differ from one another in the first region, wherein the regions of the first layer onto which the light incident from the direction of the first layer in the region of the respective third zone is reflected back and/or diffracted back changes in terms of their area, width and/or length in accordance with a transformation function in a manner dependent on the coordinate on the x2 and/or y2 coordinate axis.

37. A multi-layer body comprising:

a first layer having a multiplicity of opaque and/or reflective first zones, which are respectively separated from one another by one or a plurality of transparent second zones, wherein the first zones are shaped as micro images having a smallest dimension of less than 100 µm and are arranged in accordance with a micro image grid having a distance between adjacent micro images in a first spatial direction of less than 300 µm, wherein the micro image grid spans a first coordinate system having a coordinate axis x1 and a coordinate axis y1 at right angles thereto;

a second layer composed of a transparent material, said second layer being arranged below the first layer; and a reflection layer arranged below the second layer, wherein the second layer has a multiplicity of third zones, in each of which a microstructure is impressed into the interface—facing away from the first layer—between the second layer and the reflection layer, which is covered with the reflection layer, wherein each of the microstructures is configured such that it reflects back and/or diffracts back light incident perpendicularly with respect to the plane spanned by the first layer from the direction of the first layer in the region of the respective third zone onto a focus region of the first layer, the focus region having an area smaller than the area of the respective third zone by at least a factor of 10, and wherein the microstructures are arranged in accordance with a microstructure grid having a distance between adjacent microstructures in a second spatial direction of less than 300 μm, which microstructure grid spans a second coordinate system having a coordinate axis x2 and a coordinate axis y2 at right angles thereto, and wherein, in a first region of the multi-layer body, the micro images of the micro image grid and the microstructures of the microstructure grid are arranged in overlapping fashion in a fixed position with respect to one another and the microstructure distance determined by the distance between the area centroids of adjacent third zones and the micro image distance determined by the distance between the area centroids of adjacent first zones differ from one another in at least one third spatial direction in the first region by not more than 10%, and wherein, in the first region, the area occupied by the first zones is smaller than the area occupied by the third zones by at least a factor of 4, and wherein, in a second region of the multi-layer body, said second region being arranged alongside the first region, the microimages of the microimage grid and the microstructures of the microstructure grid are arranged in overlapping fashion in a fixed position with respect to one another and the microstructure distance determined by the distance between the area centroids of adjacent third zones and the microimage distance determined by the distance between the area centroids of adjacent first zones differ from one another in at least one spatial direction in the second region by not more than 10%, and wherein, in the second region, the microimage grid and/or the microstructure grid differ(s) relative to the microimage grid and/or the microstructure grid in the first region in terms of one or more of the parameters selected from the group microimage distance, microstructure distance, orientation of the x1-, x2-, y1-, y2-axis and distortion of the microimages.

38. The multi-layer body as claimed in claim 37, wherein the difference between the microimage distance and the microstructure distance is positive in the first region and negative in the second region.

39. The multi-layer body as claimed in claim 37, wherein two or more first and second regions are arranged alternately alongside one another.

40. The multi-layer body as claimed in claim 37, wherein the microimages of the microimage grid differ from one another in the first region and in the second region.

41. The multi-layer body as claimed in claim 37, wherein, in the first region and in the second region, the respective microimage grid and/or the respective microstructure grid have/has a phase offset with respect to one another in relation to the coordinate axis y1 and/or y2.

42. The multi-layer body as claimed in claim 37, wherein the microstructures of the microstructure grid in the first region differ from the microstructures of the microstructure grid in the second region, wherein the regions of the first layer onto which the light incident from the direction of the first layer in the region of the respective third zones is reflected back and/or diffracted back differ in terms of their area, width and/or length.

* * * * *